US010113892B2

(12) United States Patent
Ike (10) Patent No.: US 10,113,892 B2
(45) Date of Patent: Oct. 30, 2018

(54) MEASURING APPARATUS AND METHOD OF MANUFACTURING THE MEASURING APPARATUS

(71) Applicant: Azbil Corporation, Tokyo (JP)

(72) Inventor: Shinichi Ike, Tokyo (JP)

(73) Assignee: Azbil Corporation, Tokyo (JP)

( * ) Notice: Subject to any disclaimer, the term of this patent is extended or adjusted under 35 U.S.C. 154(b) by 130 days.

(21) Appl. No.: 15/353,277

(22) Filed: Nov. 16, 2016

(65) Prior Publication Data

US 2017/0153138 A1 Jun. 1, 2017

(30) Foreign Application Priority Data

Nov. 30, 2015 (JP) .................................. 2015-233481

(51) Int. Cl.
G01F 1/684 (2006.01)
G01F 1/56 (2006.01)
G01F 1/699 (2006.01)
G01F 1/69 (2006.01)

(52) U.S. Cl.
CPC .............. *G01F 1/6847* (2013.01); *G01F 1/56* (2013.01); *G01F 1/69* (2013.01); *G01F 1/699* (2013.01)

(58) Field of Classification Search
CPC . G01F 1/6847; G01F 1/69; G01F 1/56; G01F 1/699
See application file for complete search history.

(56) References Cited

U.S. PATENT DOCUMENTS

| 4,672,997 | A | 6/1987 | Landis et al. |
| 5,279,154 | A * | 1/1994 | Vavra ..................... G01F 1/6847 73/202.5 |
| 6,062,077 | A | 5/2000 | Azima |
| 6,681,625 | B1 * | 1/2004 | Berkcan ................ G01F 1/6847 73/204.15 |
| 6,813,944 | B2 | 11/2004 | Mayer et al. |
| 7,096,729 | B2 * | 8/2006 | Repko ................... G01F 1/6845 73/204.26 |
| 7,437,928 | B2 * | 10/2008 | Bos ........................ G01F 1/6847 73/204.22 |

(Continued)

FOREIGN PATENT DOCUMENTS

| GB | 1 248 563 A | 10/1971 |
| JP | 2003-532099 A | 10/2003 |

(Continued)

OTHER PUBLICATIONS

European Patent Office, "Extended European Search Report," issued in European Patent Application No. 16 198 645.0, which is a European Counterpart of U.S. Appl. No. 15/353,277, dated Mar. 17, 2017, 9 pages.

(Continued)

*Primary Examiner* — Freddie Kirkland, III
(74) *Attorney, Agent, or Firm* — Amster, Rothstein & Ebenstein (57) ABSTRACT

A measuring apparatus including a tubular member, a sensor fixed to an outer peripheral surface of the tubular member, and a circuit board that relays a detection signal from the sensor, the circuit board being fixed to the outer peripheral surface in an area different from an area where the sensor is fixed and being separated from the sensor, and a wire that electrically connects the sensor and the circuit board.

20 Claims, 7 Drawing Sheets

(56) References Cited

U.S. PATENT DOCUMENTS

| | | | | |
|---|---|---|---|---|
| 7,444,863 | B2* | 11/2008 | Sakai | G01F 1/6847 |
| | | | | 73/204.27 |
| 7,600,422 | B2* | 10/2009 | Hasebe | G01F 1/684 |
| | | | | 73/204.17 |
| 7,617,724 | B2* | 11/2009 | Hasebe | G01F 1/696 |
| | | | | 73/204.27 |
| 7,624,632 | B1* | 12/2009 | Hoyle | G01M 3/2807 |
| | | | | 73/204.11 |
| 7,895,888 | B2* | 3/2011 | Hasebe | G01F 1/6845 |
| | | | | 73/204.27 |
| 2003/0049877 | A1 | 3/2003 | Mayer et al. | |
| 2007/0295079 | A1 | 12/2007 | Bos et al. | |
| 2008/0047339 | A1* | 2/2008 | Hasebe | G01F 1/684 |
| | | | | 73/204.17 |
| 2010/0218614 | A1 | 9/2010 | Minamitani et al. | |
| 2016/0178420 | A1* | 6/2016 | Sasaki | B23K 11/115 |
| | | | | 73/204.27 |

FOREIGN PATENT DOCUMENTS

| | | |
|---|---|---|
| JP | 2007-333670 A | 12/2007 |
| JP | 2014-085185 A | 5/2014 |
| JP | 2015-034748 A | 2/2015 |
| WO | 91/19959 A1 | 12/1991 |
| WO | 2003/102974 A1 | 12/2003 |

OTHER PUBLICATIONS

European Patent Office, "Annex to the Communication," issued in European Patent Application No. 16 198 645.0, which is a European Counterpart of U.S. Appl. No. 15/353,277, with an issuance date of May 22, 2018, 5 pages.

R Siev et al., 2.13 Mass Flowmeters—Thermal: In: "Instrument Engineers Handbook—Process Measurement and Analysis—4th Edition—vol. 1", 2003, Xp055472790, pp. 244-250.

* cited by examiner

| | Impact Test Result | Assembly Test Result |
|---|---|---|
| Conventional Flow Meter | Breakage Occurred 2/4 Times | Breakage Occurred 2/13 Times |
| Flow Meter of The Present Invention | Breakage Not Occurred 10/10 Times | Breakage Not Occurred 30/30 Times |

Fig. 8

MEASURING APPARATUS AND METHOD OF MANUFACTURING THE MEASURING APPARATUS

CROSS-REFERENCE TO RELATED APPLICATION

The present application claims the benefit of and priority to Japanese Patent Application No. 2015-233481, filed on Nov. 30, 2015, the entire contents of which are incorporated by reference herein.

TECHNICAL FIELD

The present invention relates to a measuring apparatus and a method of manufacturing the measuring apparatus.

BACKGROUND

In the related art, a liquid flow sensor described in PTL 1 is known as a flow sensor for detecting variations in flow rate of a fluid. The flow sensor includes a semiconductor module incorporating two temperature sensors provided respectively on an upstream side and a downstream side of a fluid flow and a heat source. The flow sensor is provided with a pipe that guides a liquid, and the semiconductor module is provided on an outer surface of the pipe via an adhesive such as a thermally conductive paste. The two temperature sensors and the heat source are in thermal contact with the outer surface of the pipe. Such a structure of the flow sensor is employed when contact of the fluid to materials other than the pipe is not desired, or when the semiconductor module is larger than an inner diameter of the pipe and thus cannot be disposed in the interior of the pipe.

CITATION LIST

Patent Literature

[PTL 1] JP-T-2003-532099

SUMMARY

In the flow sensor described in PTL 1, a printed circuit board that mediates an electrical signal from the semiconductor module is adhered to the semiconductor module on a lower side in the direction of gravity, and is hung down from the semiconductor module like a weight. The semiconductor module is generally provided with a thin-film type heat-insulating diaphragm, which is a part where an insulation film covers a cavity. Here, in a case where a load, such as a vibration or an impact, is applied to the flow sensor having the configuration described above, the printed circuit board that is hung down like a weight amplifies the load, such as the vibration or the impact, so that a stress corresponding to the amplified load is applied to a joint surface between the semiconductor module and the pipe, that is, a joint surface between the outer surface of the pipe and a surface of the diaphragm of the semiconductor module. Since the diaphragm portion is of a thin-film type, and is low in mechanical strength, the diaphragm portion may be broken by the stress corresponding to the load, such as the vibration or the impact, applied thereto. A similar problem may occur in measuring apparatuses other than the flow sensors that also have sensors fixed to a pipe.

Accordingly, it is an object of the present invention to provide a measuring apparatus having an improved tolerance against a load, such as a vibration or an impact, and a method of manufacturing such a measuring apparatus.

In order to solve the above-described problem, a measuring apparatus according to an aspect of the present invention includes a tubular member, a sensor fixed to an outer peripheral surface of the tubular member, and a circuit board that relays a detection signal from the sensor, the circuit board being fixed to the outer peripheral surface in an area different from an area where the sensor is fixed and being separated from the sensor, and a wire that electrically connects the sensor and the circuit board.

In the above-described measuring apparatus, a bottom surface of the sensor may be separated from the circuit board.

In the above-described measuring apparatus, a cut-away is formed in the circuit board, and the sensor may be positioned in the cut-away.

In the above-described measuring apparatus, the sensor may be provided with a diaphragm.

In the above-described measuring apparatus, the tubular member may be a glass capillary.

The above-described measuring apparatus may further include a sensor housing including the sensor and the circuit board, and at least one end portion of the tubular member may be fixed to the sensor housing via a joint member.

In the above-described measuring apparatus, the sensor may measure a flow velocity of a fluid flowing in the tubular member.

In the above-described measuring apparatus, the sensor may measure a flow rate of the fluid flowing in the tubular member.

In the above-described measuring apparatus, the sensor may include a temperature sensor that measures a temperature of the fluid flowing in the tubular member and a heater that supplies calorific power to the fluid, and the heater may supply a calorific power corresponding to a difference between the temperature measured by the temperature sensor and a setting temperature.

In the above-described measuring apparatus, the circuit board is provided with a plurality of the cut-aways, and the temperature sensor may be positioned in one of the cut-aways and the heater may be positioned on another one of the cut-aways.

In order to solve the above-described problem, a method of manufacturing the measuring apparatus according to an aspect of the present invention includes a step of fixing a sensor in a first area of an outer peripheral surface of a tubular member; a step of fixing a circuit board that relays a detection signal from the sensor and that is separated from the sensor to the outer peripheral surface in a second area different from the first area; and a step of electrically connecting the sensor and the circuit board.

In the above-described method of manufacturing the measuring apparatus, a bottom surface of the sensor may be separated from the circuit board.

In the above-described method of manufacturing the measuring apparatus, a cut-away is formed in the circuit board, and the sensor may be positioned in the cut-away.

In the above-described method of manufacturing the measuring apparatus, the sensor may be provided with a diaphragm.

In the above-described method of manufacturing the measuring apparatus, the tubular member may be a glass capillary.

The above-described method of manufacturing the measuring apparatus may further include a step of fixing at least one end portion of the tubular member to a sensor housing including the sensor and the circuit board via a joint member.

In the above-described method of manufacturing the measuring apparatus, the sensor may be a sensor that measures a flow velocity of a fluid flowing in the tubular member.

In the above-described method of manufacturing the measuring apparatus, the sensor may be a sensor that measures a flow rate of the fluid flowing in the tubular member.

In the above-described method of manufacturing the measuring apparatus, the sensor may include a temperature sensor that measures a temperature of the fluid flowing in the tubular member and a heater that supply calorific power to the fluid.

In the above-described method of manufacturing the measuring apparatus, the circuit board is provided with a plurality of the cut-aways, and the temperature sensor may be positioned in one of the cut-aways and the heater may be positioned in another one of the cut-aways.

According to the present invention, tolerance against a load, such as a vibration and an impact, may be improved.

DETAILED DESCRIPTION

Hereinafter, embodiments of the present invention will be described with reference to the drawings. In the description of the drawings given below, the same or similar parts are denoted by the same or similar reference signs. The drawings are illustrated schematically only, and may not match up with actual dimensions or ratios. Among the drawings, portions which are different from each other in dimension and ratio may be included. Furthermore, the same components in the respective drawings are denoted by the same reference signs as much as possible, and overlapped description will be omitted.

(Configuration)

Figure 1:
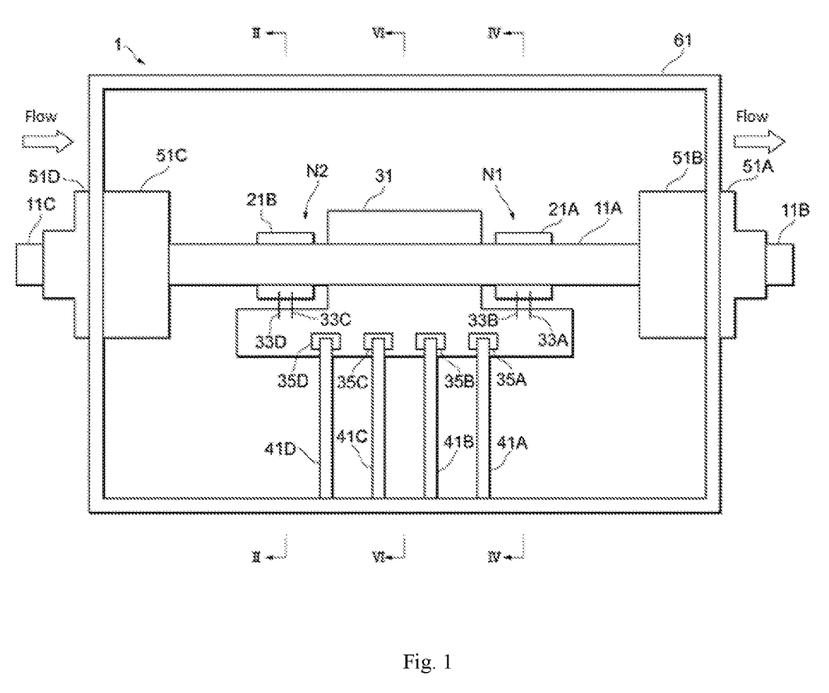
FIG. 1 is a schematic top view illustrating a configuration example of a flow meter according to an embodiment of the present invention.
Figure 2:
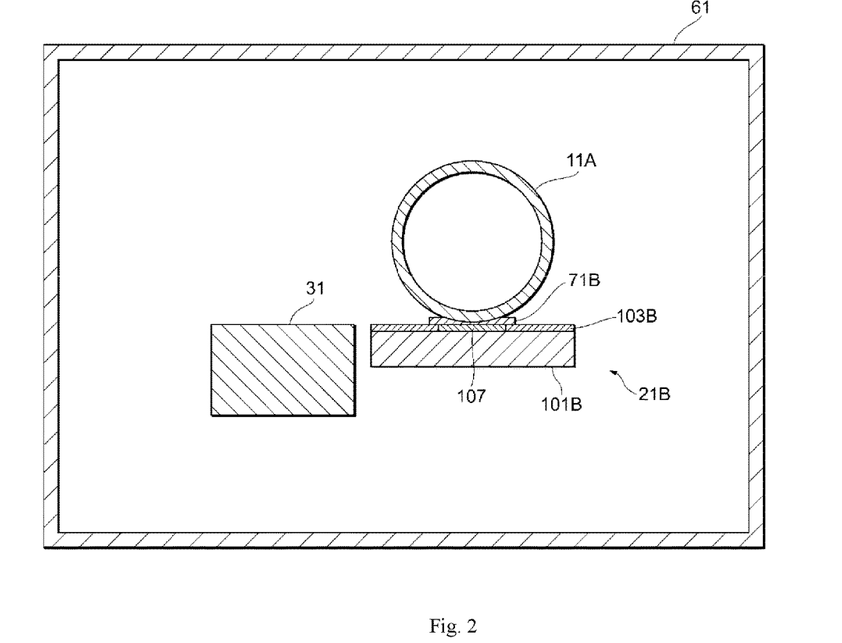
FIG. 2 is a cross-sectional view viewed from a direction of II-II in FIG. 1.
Figure 3:
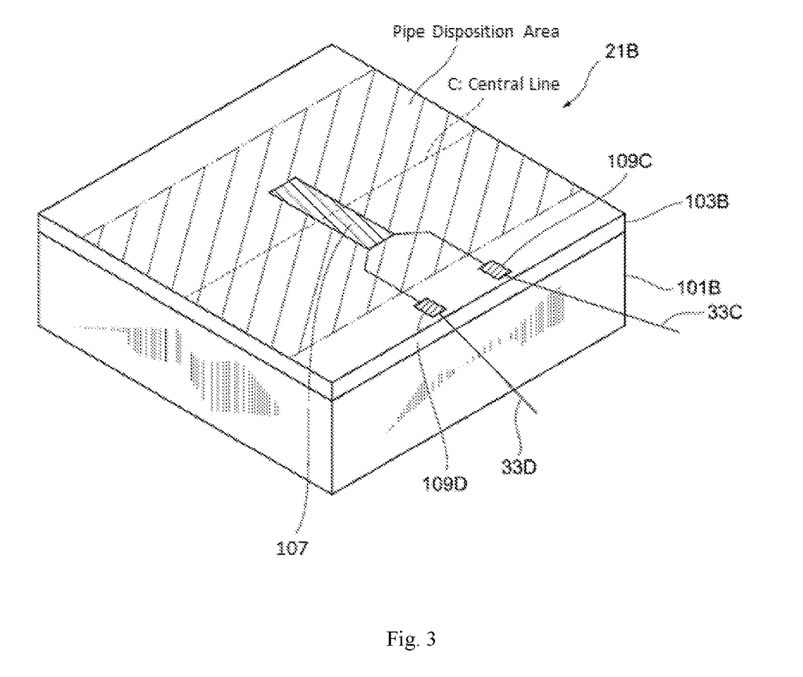
FIG. 3 is a perspective view illustrating a configuration example of a flow sensor according to an embodiment of the present invention.
Figure 4:
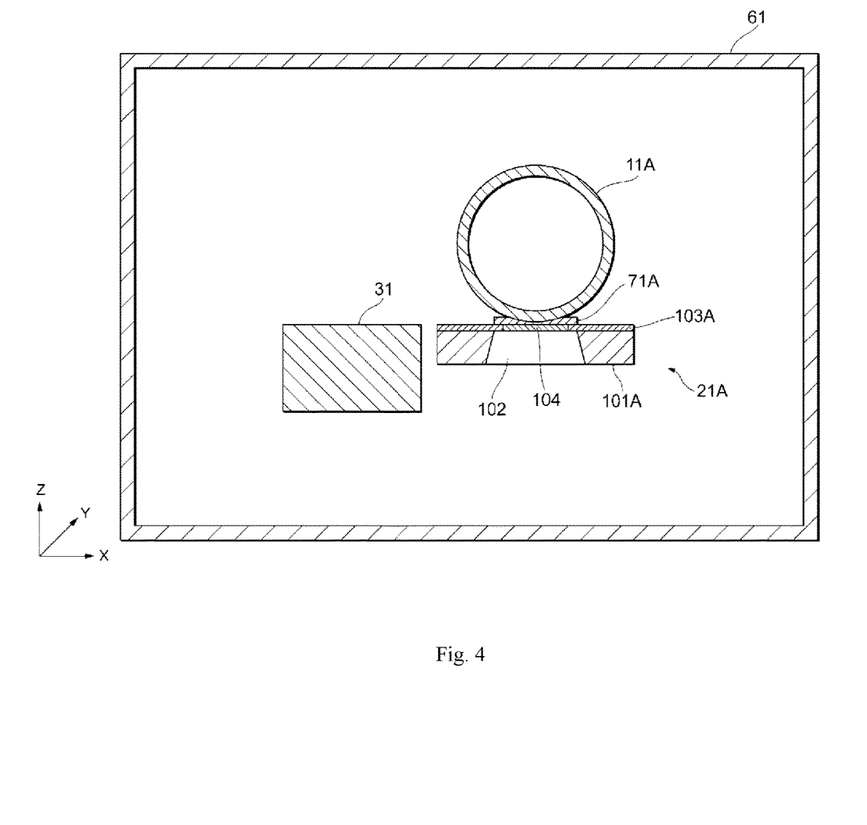
FIG. 4 is a cross-sectional view viewed from a direction of IV-IV in FIG. 1.
Figure 5:
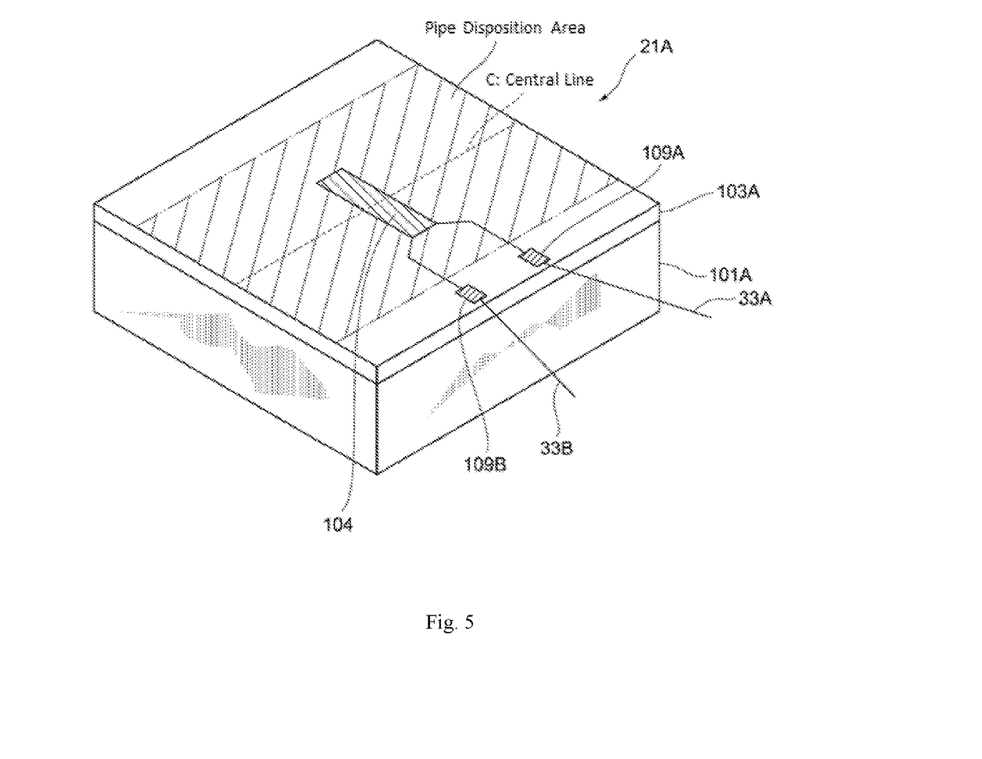
FIG. 5 is a perspective view illustrating a configuration example of the flow sensor according to an embodiment of the present invention.
Figure 6:
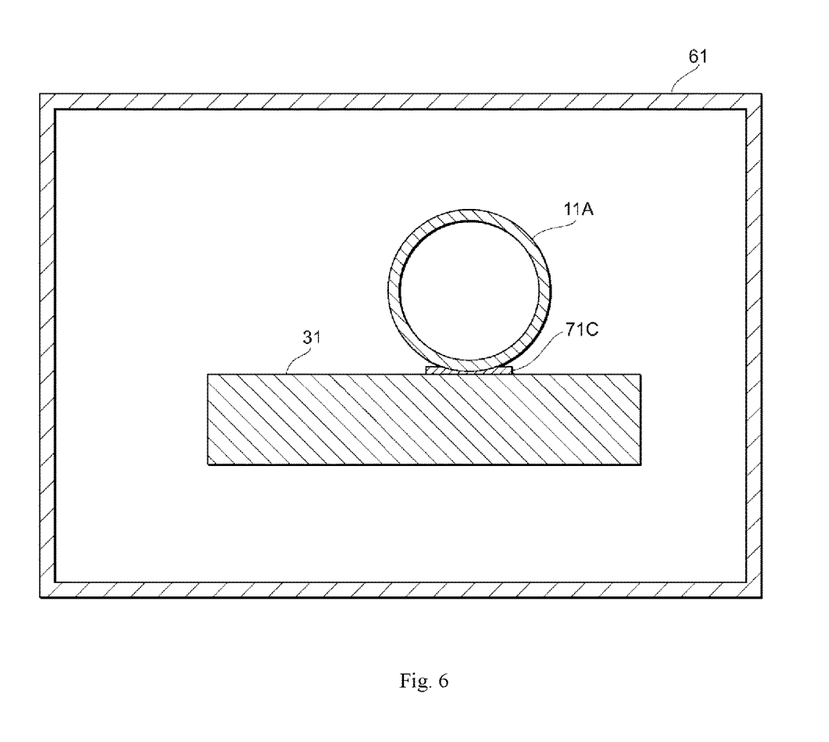
FIG. 6 is a cross-sectional view viewed from a direction of VI-VI in FIG. 1.

With reference to FIG. 1 to FIG. 6, a configuration of a flow meter, which is an example of a measuring apparatus, according to an exemplary embodiment of the present invention will be described. FIG. 1 is a schematic top view illustrating a configuration example of a flow meter according to an embodiment of the present invention. FIG. 2 is a cross-sectional view viewed from a direction of II-II in FIG. 1. FIG. 3 is a perspective view illustrating a configuration example of a temperature sensor according to an embodiment of the present invention. FIG. 4 is a cross-sectional view viewed from a direction of IV-IV in FIG. 1. FIG. 5 is a perspective view illustrating a configuration example of a heater according to an embodiment of the present invention. FIG. 6 is a cross-sectional view viewed from a direction of VI-VI in FIG. 1.

As illustrated in FIG. 1, a flow meter 1 includes, for example, a pipe 11 (or pipe segments 11A-11C), which is an example of a tubular member, a flow sensor 21 (shown with flow sensor elements 21A and 21B), which is an example of a sensor that measures a flow rate of a fluid flowing in the pipe 11 (or pipe segment 11A), a relay circuit board 31, which is an example of a circuit board that relays a detection signal from the flow sensor 21 (and flow sensor elements 21A and 21B) via wires 33A-33D, and a sensor housing 61 that fixes both ends of the pipe 11 (or pipe segment 11A) via joint members 51(A-D).

The pipe 11 (or pipe segment 11A) is a tubular member that allows a fluid to pass therethrough. For example, the pipe 11 (or pipe segment 11A) has an adequate inner diameter corresponding to the flow rate of the fluid, a thickness enough to tolerate a pressure of the fluid, and an optimal length, and is determined depending on conditions of usage. The pipe 11 (or pipe segment 11A) may be formed of materials such as ceramics, plastics, and stainless steel, and is, for example, a glass capillary. The thickness of the pipe 11 (or pipe segment 11A) is thin enough to avoid becoming an obstacle for thermal conduction and, for example, is on the order of tens of micrometers. Both ends of the pipe segment 11A are coupled to joint members 51B and 51C, respectively, one end of a pipe segment 11B is coupled to a joint member 51A, and an end of a pipe segment 11C is coupled to a joint member 51D. The pipe segment 11A and the pipe segment 11B are coupled via the joint members 51A and 51B, and the pipe segment 11A and the pipe segment 11C are coupled via the joint members 51C and 51D. The pipe segments 11A to 11C may be manufactured from the same member or may be manufactured from different members.

The flow sensor 21 (with sensor elements 21A and 21B) is means for measuring at least one of the flow velocity and the flow rate of the fluid flowing in the pipe segment 11A. As illustrated in FIGS. 1, 2, and 4, the flow sensor 21 is used by being fixed to a first area on an outer peripheral surface of the pipe segment 11A, which is a portion interposed between the joint members 51B and 51C of the pipe 11 (or pipe segment 11A). The flow sensor 21 includes, for example, on an outer peripheral surface of the pipe segment 11A, a temperature sensor 21B that is located on an upstream side of a flow of the fluid and measures a temperature of the fluid, and a heater 21A that is located on a downstream side of the flow of the fluid and supplies a calorific power to the fluid. As illustrated in FIG. 2, a bottom surface of the temperature sensor 21B is separated from a relay circuit board 31. As illustrated in FIG. 4, a bottom surface of the heater 21A is separated from the relay circuit board 31.

As illustrated in FIG. 2 and FIG. 3, the temperature sensor 21B includes, for example, a base circuit board 101B, an insulation film 103B disposed on the base circuit board 101B, a temperature measuring resistive element 107 provided in the insulation film 103B, and electric connecting portions 109C, 109D that output an electrical signal corresponding to a physical amount detected by the temperature measuring resistive element 107, which is an example of the detection signal, via wires 33C, 33D.

The pipe 11 (or pipe segment 11A) is fixed to the temperature sensor 21B along a centerline C, for example, via a thermally conductive adhesive 71B. The thermally conductive adhesive 71 (71A and 71B shown in FIGS. 4 and 2, respectively) is a thermally conductive material interposed between the flow sensor 21 (elements 21A and 21B) and an outer wall of the pipe 11 (or pipe segment 11A). The thermally conductive adhesive 71 is formed of a thermally conductive material capable of transferring heat in both directions, and transfers heat of the flow sensor 21 efficiently to the fluid in the interior of the pipe 11, and transfers heat in the interior of the pipe 11 to the flow sensor 21. The thermally conductive adhesive 71B is applied, for example, to an area where the pipe 11 is fixed, and the temperature sensor 21B disposed on the base circuit board 101B is installed on the outer wall of the pipe 11 via the thermally conductive adhesive 71B. The thermally conductive adhesive 71 is an adhesive that fixes the flow sensor 21 to the pipe 11 by being solidified.

Examples of the thermally conductive adhesive 71 include a paste, which is, for example, a mixture of a conductive filler and a binder resin. Examples of the conductive filler include, for example, metallic fine powder such as of silver, copper, gold, iron, nickel, and aluminum, and carbon black. Examples of the binder resin include resins such as epoxy resin, polyester resin, urethane resin, phenol resin, and imide resin.

As illustrated in FIG. 4 and FIG. 5, the heater 21A includes, for example, a base circuit board 101A provided with a cavity 102, an insulation film 103A disposed on the base circuit board 101A so as to cover the cavity 102, a temperature measuring resistive element 104 provided in the insulation film 103A, and electric connecting portions 109A, 109B that output an electrical signal, which is an example of the detection signal, corresponding to a physical amount detected by the temperature measuring resistive element 104 via wires 33A, 33B. The heater 21A has a back side etching structure in which a heat-insulating diaphragm, which is a portion of the insulation film 103A that covers the cavity 102, is formed from below the base circuit board 101A.

Here, the measurement method of the flow sensor 21 will be described. The heater 21A of the flow sensor 21 supplies a calorific power to a fluid to raise the temperature to be higher than the temperature of the fluid flowing in the pipe 11 (the temperature measured by the temperature sensor 21B) by a certain degree. For example, when the heater 21A supplies a calorific power to a fluid to raise the temperature to be higher than the measurement temperature by 10° C., if the measurement temperature is 20° C., the heater 21A supplies a calorific power to raise the temperature of the fluid to 30° C., and if the measurement temperature is 50° C., the heater 21A supplies the calorific power to raise the temperature of the fluid to 60° C. In other words, a setting temperature of the heater 21A, which is a temperature higher than the measurement temperature by a certain degree, varies in accordance with the measurement temperature. The heater 21A supplies a calorific power corresponding to the difference between the measurement temperature and the setting temperature to the fluid to raise the temperature of the fluid.

It is known that electric energy required from the heater 21A for supplying a calorific power corresponding to the difference between the measurement temperature and the setting temperature to the fluid has a correlation with the flow velocity and the flow rate of the fluid flowing in the pipe 11. Therefore, at least one of the flow velocity and the flow rate of the fluid flowing in the pipe 11 can be measured (calculated) based on the electric energy for supplying the calorific power corresponding to the difference between the measurement temperature and the setting temperature to the fluid.

The measurement method of the flow velocity and the flow rate of the fluid by the flow sensor 21 is not limited thereto, and other measurement methods may be employed. The heater 21A and the temperature sensor 21B of the flow sensor 21 do not necessarily have to be fixed to the pipe 11 separately from each other, and the heater 21A and the temperature sensor 21B may be fixed integrally to the pipe 11.

The relay circuit board 31 is a circuit board that relays the detection signal from the flow sensor 21. As illustrated in FIG. 1 and FIG. 6, the relay circuit board 31 is electrically connected to the heater 21A, for example, via wires 33A and 33B, and to the temperature sensor 21B via wires 33C and 33D. The relay circuit board 31 relays an electrical signal corresponding to an electrical resistance of a resistive element (e.g., elements 104 and 107) provided on the flow sensor 21 (elements 21A and 21B), for example, via the respective wires 33A-D.

The relay circuit board 31 outputs the detection signal from the flow sensor 21 to a flow rate measuring unit (not illustrated) via wires 41(A-D) connected respectively to the electric connecting portions 35(A-D).

Furthermore, as illustrated in FIG. 1 and FIG. 6, the relay circuit board 31 is fixed to the outer peripheral surface of the pipe 11 (or pipe segment 11A) in a second area, which is different from the first area(s) where the flow sensor 21 (elements 21A and 21B) is/are fixed via, for example, an adhesive 71C. The relay circuit board 31 is fixed to the outer peripheral surface of the pipe 11 separately from the flow sensor 21. Specifically, the relay circuit board 31 is fixed to the outer peripheral surface of the pipe 11 in an area different from the areas where the temperature sensor 21B and the heater 21A are fixed. However, at least the relay circuit board 31 is electrically connected to each flow sensor 21 via each of the wires 33A-D so that relaying of the detection signal from the flow sensor 21 is enabled.

As illustrated in FIG. 1, the relay circuit board 31 is provided with cut-aways N (or N1 and N2), so that the flow sensor 21 (elements 21A and 21B) is positioned in the cut-aways N (N1 and N2). Specifically, the relay circuit board 31 is provided with a plurality of cut-aways N1 and N2, and is configured in such a manner that the temperature sensor 21B is disposed in one cut-away N2, and the heater 21A is disposed in the other cut-away N1. The number of the cut-aways N is not limited, and may be one or more than two.

The wires 33 and 41 need simply to contain a material which can transmit an electrical signal and may be a metallic wire including, but not limited to, a gold wire and a copper wire, for example. Examples of materials which may be used for forming the base circuit board 101 (101A and 101B) include silicon (Si). Examples of materials which may be used for forming the insulation film 103 (103A and 103B) include silicon oxide ($SiO_2$). Examples of the materials which may be used for forming the temperature measuring resistive elements 104 and 107 include platinum (Pt), and these elements may be formed by lithography or the like.

The sensor housing 61 is a member that accommodates the flow sensor 21. The joint members 51(A-D) are members coupled to at least one end portion of the pipe 11 to couple the pipe segment 11A and the pipe segment 11B and to couple the pipe segment 11A and the pipe segment 11C as illustrated in FIG. 1. As illustrated in FIG. 1, at least one end portion of the pipe 11 (or pipe segment 11A) is fixed to the sensor housing 61 by the joint members 51(A-D). The joint members 51(A-D) are formed, for example, of ceramic, plastic, stainless, and the like.

(Comparative Reference Example)

Figure 7:
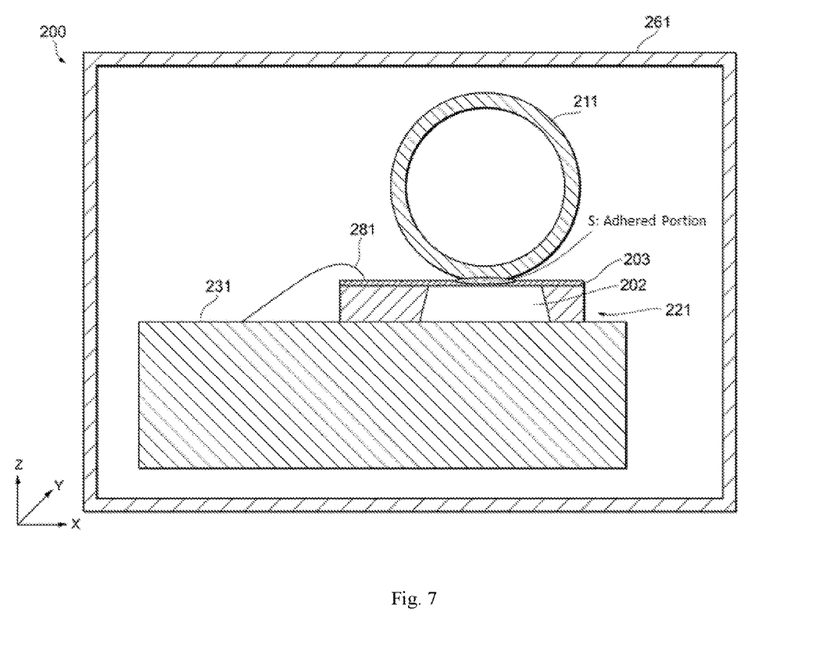
FIG. 7 is a cross-sectional view illustrating a configuration example of a flow meter as a reference example.

FIG. 7 is a drawing explaining a reference example for better understanding of the effects of the present invention. Specifically, FIG. 7 is a cross-sectional view illustrating a configuration example of a flow meter as a reference example (related art). As illustrated in FIG. 7, a flow meter 200 of the related art includes, for example, a pipe 211, a sensor 221, a printed circuit board 231 electrically connected to the sensor 221 via a wire 281, and a sensor housing 261 that accommodates the sensor 221.

As illustrated in FIG. 7, the printed circuit board 231 is adhered to the sensor 221 from below like a weight. The sensor 221 is also provided with a thin-film type heat-insulating diaphragm, which is a part where an insulation film 203 covers a cavity 202. Here, when a load, such as a vibration or an impact, is applied to the sensor 221, a stress corresponding to the load is applied to an adhered portion S (indicated by a circle in FIG. 7) between the sensor 221 and the pipe 211. Since the diaphragm portion is of a thin-film type, and is low in mechanical strength, the diaphragm portion—and more specifically, the sensor—may be subjected to disconnection by the stress corresponding to the load, such as the vibration or the impact, applied thereto. As described above, the flow meter illustrated in FIG. 7 has a problem that the adhered portion between the sensor and the pipe may easily be broken, that is, disconnection of the sensor may easily occur, due to the load, such as the vibration and the impact.

(Results of Experiment)

Figure 8:
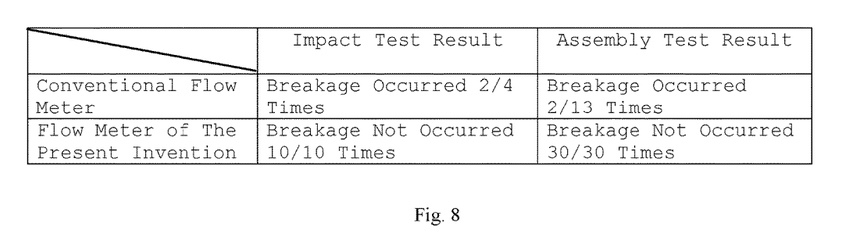
FIG. 8 is a table illustrating test results for a flow meter configured in accordance with an exemplary embodiment of the present invention.

FIG. 8 is a graph that describes the effects of the present invention. Specifically, FIG. 8 is a drawing showing results of an impact test and an assembly test performed for the flow meter.

The impact test is conducted for testing a condition of breakage of the sensor at an adhered portion between the sensor and the pipe after an impact of 50 G at the maximum is applied to the flow meter at least three times each in the X, Y, and Z directions illustrated in FIG. 4 and FIG. 7, for example. As illustrated in FIG. 8, when the above-described impact test was conducted four times for the flow meter of the related art, disconnection (breakage) of the sensor occurred twice. In contrast, as regards the flow meter of the present invention, no breakage occurred in the flow sensor of the present invention even when the above-described impact test was conducted ten times.

The assembly test is conducted for testing a condition of breakage of the sensor at an adhered portion between the sensor and the pipe when the sensor is assembled to the sensor housing. As illustrated in FIG. 8, when the above-described assembly test was conducted thirteen times for the sensor of the related art, disconnection (breakage) of the sensor occurred twice. In contrast, as regards the flow sensor of the present invention, no breakage occurred in the flow sensor of the present invention even when the above-described assembly test was conducted thirty times.

As described thus far, in the flow meter 1 of an exemplary embodiment of the present invention, the flow sensor 21 and the relay circuit board 31 are fixed to the outer peripheral surface of the pipe 11 separately at different areas. Therefore, the relay circuit board 31 does not act like a weight for the flow sensor 21, and thus an improvement in tolerance against a load, such as a vibration and an impact, is achieved.

(Other Embodiments)

The embodiments described above are for easy understanding of the present invention, and are not intended for limiting the present invention. The embodiments described above are examples only, and are not intended to exclude various modification and application of technologies, which are not explicitly described above. In other words, the preset invention may be implemented by modifying various elements (combining the embodiments or the like) without departing from the gist of the invention.

In each of the embodiments described above, the flow meter is exemplified as the measuring apparatus, and the flow sensor is exemplified as the sensor. However, the invention is not limited thereto, and the measuring apparatus may be of any type as long as it has a configuration in which the sensor is installed on an outer wall of a pipe. For example, a configuration in which a calorimeter is employed as the measuring apparatus and a calorific power sensor is employed as the sensor, and a configuration in which a thermometer is employed as the measuring apparatus and a temperature sensor is employed as the sensor are also applicable.

DESCRIPTION OF REFERENCE NUMERALS AND SIGNS

1: flow meter; 11 (11A-C): pipe; 21: flow sensor; 21A: heater; 21B: temperature sensor; 31: relay circuit board; 33(A-D), 41(A-D): wire; 35(A-D), 109(A-D): electric connecting portion; 51(A-D): joint member; 61: sensor housing; 71(A-C): thermally conductive adhesive; 101(A-B): base circuit board; 102: cavity; 103(A-B): insulation film; 104, 107: temperature measuring resistive element

The invention claimed is:

1. A measuring apparatus comprising:
a tubular member;
a sensor fixed to a first area on an outer peripheral surface of the tubular member;
a circuit board that relays a detection signal from the sensor, the circuit board being fixed to a second area on the outer peripheral surface that is different from the first area and being separated from the sensor; and
one or more wires that electrically connect the sensor and the circuit board,
wherein the sensor and the circuit board are separately supported by being fixed to the first and second areas on the outer peripheral surface, respectively, and are otherwise connected to one another solely by electrical connection via the one or more wires so as to reduce a mechanical coupling between the circuit board and the sensor.

2. The measuring apparatus according to claim 1, wherein a bottom surface of the sensor is separated from the circuit board.

3. The measuring apparatus according to claim 1, wherein the circuit board is provided with a cut-away, and the sensor is positioned in the cut-away.

4. The measuring apparatus according to claim 1, wherein the sensor comprises a diaphragm.

5. The measuring apparatus according to claim 1, wherein the tubular member is a glass capillary.

6. The measuring apparatus according to claim 1, further comprising:
a sensor housing comprising the sensor and the circuit board, wherein at least one end portion of the tubular member is fixed to the sensor housing via a joint member.

7. The measuring apparatus according to claim 1, wherein the sensor measures a flow velocity of a fluid flowing in the tubular member.

8. The measuring apparatus according to claim 1, wherein the sensor measures a flow rate of a fluid flowing in the tubular member.

9. The measuring apparatus according to claim 1, wherein the sensor comprises a temperature sensor that measures a temperature of a fluid flowing in the tubular member and a heater that supplies a calorific power to the fluid, wherein
the heater supplies the calorific power corresponding to a difference between a temperature measured by the temperature sensor and a setting temperature.

10. The measuring apparatus according to claim 9, wherein the circuit board is provided with a plurality of cut-aways, and the temperature sensor is positioned in one of the cut-aways and the heater is positioned in another one of the cut-aways.

11. A method of manufacturing a measuring apparatus, comprising:
fixing a sensor to a first area on an outer peripheral surface of a tubular member;
fixing a circuit board that relays a detection signal from the sensor to a second area on the outer peripheral surface that is different from the first area, the circuit board being separated from the sensor; and
electrically connecting the sensor to the circuit board with one or more wires,
wherein the sensor and the circuit board are separately supported by being fixed to the first and second areas on the outer peripheral surface, respectively, and are otherwise connected to one another solely by electrical connection via the one or more wires so as to reduce a mechanical coupling between the circuit board and the sensor.

12. The method of manufacturing a measuring apparatus according to claim 11, wherein a bottom surface of the sensor is separated from the circuit board.

13. The method of manufacturing a measuring apparatus according to claim 11, wherein the circuit board is provide with a cut-away, and the sensor is positioned in the cut-away.

14. The method of manufacturing a measuring apparatus according to claim 11, wherein the sensor comprises a diaphragm.

15. The method of manufacturing a measuring apparatus according to claim 11, wherein the tubular member is a glass capillary.

16. The method of manufacturing a measuring apparatus according to claim 11, further comprising a step of fixing at least one end portion of the tubular member to a sensor housing comprising the sensor and the circuit board via a joint member.

17. The method of manufacturing a measuring apparatus according to claim 11, wherein the sensor is a sensor that measures a flow velocity of a fluid flowing in the tubular member.

18. The method of manufacturing a measuring apparatus according to claim 11, wherein the sensor is a sensor that measures a flow rate of a fluid flowing in the tubular member.

19. The method of manufacturing a measuring apparatus according to claim 11, wherein the sensor comprises a temperature sensor that measures a temperature of a fluid flowing in the tubular member and a heater that supplies a calorific power to the fluid.

20. A method of manufacturing a measuring apparatus according to claim 19, wherein the circuit board is provided with a plurality of cut-aways, and the temperature sensor is positioned in one of the cut-aways and the heater is positioned in another one of the cut-aways.

* * * * *